E. JONES,

Assignor to J. A. MILLER, Jr.

FIRE EXTINGUISHER.

No. 10,051. Reissued Mar. 7, 1882.

WITNESSES:

Wm. L. Cooper

Joseph A. Miller Jr

INVENTOR:

Elias Jones by Joseph A. Miller atty

UNITED STATES PATENT OFFICE.

ELIAS JONES, OF PIERREPONT, NEW YORK, ASSIGNOR TO JOSEPH A. MILLER, JR., OF PROVIDENCE, RHODE ISLAND.

FIRE-EXTINGUISHER.

SPECIFICATION forming part of Reissued Letters Patent No. 10,051, dated March 7, 1882.

Original No. 119,931, dated October 17, 1871. Application for reissue filed December 9, 1880.

*To all whom it may concern:*

Be it known that I, ELIAS JONES, of Pierrepont, in the county of St. Lawrence and State of New York, have invented a new and useful Improvement in Fire-Extinguishers; and I hereby declare that the following is a full, clear, and exact description of the same, reference being had to the accompanying drawings, forming part of this specification.

The object of this invention is to distribute water in a diffused spray over a large surface.

The invention consists in providing a water-supply pipe with a head or hub from which water is discharged through nozzles or openings so that rotary movement is imparted by the reaction of the discharging water to the device, by which rotary movement the water is thrown equally to all parts within reach, and the streams are diffused by the centrifugal force imparted to the water and a finely-divided spray is thrown over a large area.

The invention further consists in the peculiar construction of the device, as will be more fully set forth hereinafter.

Figure 1:
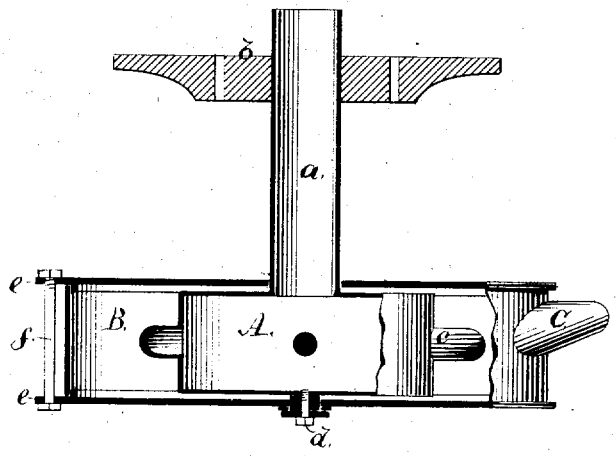
Figure 2:
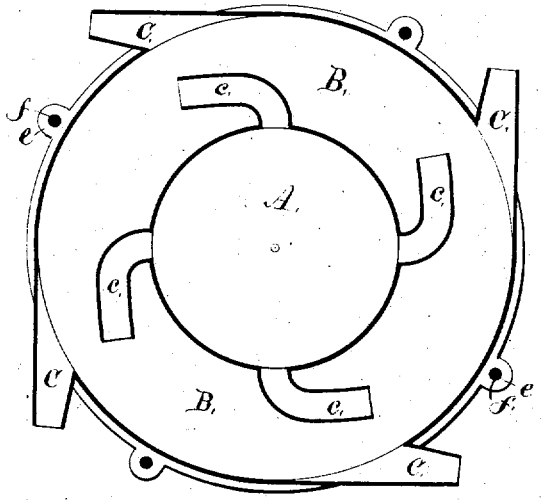

In the drawings, Figure 1 is a view of the device, partly in section; and Fig. 2 is a horizontal view of the same, the various parts being marked by letters of reference.

*a* is the water-supply pipe, firmly secured in a horizontal support, the pipe *a* being placed preferably in a vertical position so as to allow the device to revolve on the same and diffuse the water over a large surface. *b* represents such a support, which may be fastened to any suitable horizontal support—a ship's deck, for example—the pipe *a* also passing through said support.

A is the cylindrical supply-head, made fast to the bottom of the pipe *a* and provided with the outlet-openings *c c*, which are curved so as to give a rotary direction to the water.

B is the cylindrical case, through whose top the pipe *a* passes centrally, and whose bottom is connected by a bolt, *d*, with the bottom of the supply-head A, thus allowing the receptacle B to revolve freely on the pipe *a*. Ears *e e'* extend radially from the top and bottom of the case B, and are connected by bolts *f*, which fasten the top and rim of the case to its bottom.

C C are tangential discharge-openings of the case B. The rotary movement imparted to the case B by the reaction of the water discharged from the openings C C causes the water to be drawn outward equally on all sides, and by this centrifugal force the streams issuing from the discharge-openings are broken up into fine spray, covering a large surface. The openings can therefore be of larger area and few in number. They are not liable to be stopped up by impurities contained in the water, which is the case with the fixed rose-sprinkler, and will throw the finely-divided spray a greater distance, as the distance depends on the force of the water which imparts rotary motion to the device.

Having thus described my invention, I claim as new and desire to secure by Letters Patent—

1. The combination, with the supply-head, consisting of a pipe with a head having one or more outlets, of a revolving vessel provided with outlets, the direction of which is inclined or oblique to the surface of the vessel, so as to revolve the vessel by the reaction of the discharging water and distribute the same, as described.

2. The combination, with the case B, provided with tangential discharge-outlets, of the pipe *a*, terminating in a case or supply-head, A, having outlets *c*, and forming a bearing for the surrounding case B, and the screw *d*, by which the case B is secured, the whole constructed to distribute water under pressure over a circular area and diffuse the same by centrifugal force, as described.

3. In a fire-extinguisher, the combination of a supply-head, consisting of a pipe with a head having one or more outlets, and a revolving distributer, consisting of a loosely-fitting case surrounding said pipe and its head and covering the outlets thereof, said case having outlets from which water is discharged tangentially, as described.

In witness whereof I have hereunto affixed my name.

ELIAS JONES.

Witnesses:
GEO. Z. ERWIN,
WM. H. DART.